US010753820B2

(12) United States Patent
Roy et al.

(10) Patent No.: US 10,753,820 B2
(45) Date of Patent: Aug. 25, 2020

(54) INTEGRITY MONITORING OF CONDUITS

(75) Inventors: James Edward Roy, Alberta (CA);
Christopher John Kelley, Farnborough (GB)

(73) Assignees: Optasense Holdings Limited (GB);
Christopher John Kelley (GB)

( * ) Notice: Subject to any disclaimer, the term of this patent is extended or adjusted under 35 U.S.C. 154(b) by 31 days.

(21) Appl. No.: 14/115,255

(22) PCT Filed: May 4, 2012

(86) PCT No.: PCT/GB2012/050982
§ 371 (c)(1),
(2), (4) Date: Nov. 1, 2013

(87) PCT Pub. No.: WO2012/150463
PCT Pub. Date: Nov. 8, 2012

(65) Prior Publication Data
US 2014/0069173 A1     Mar. 13, 2014

(30) Foreign Application Priority Data
May 4, 2011 (GB) .................... 1107391.3

(51) Int. Cl.
*G01M 3/24*    (2006.01)
*G01M 5/00*    (2006.01)
*E21B 47/10*   (2012.01)
*E21B 47/12*   (2012.01)

(52) U.S. Cl.
CPC ............. *G01M 3/24* (2013.01); *E21B 47/102* (2013.01); *E21B 47/123* (2013.01); *G01M 3/243* (2013.01); *G01M 3/246* (2013.01); *G01M 5/0025* (2013.01); *G01M 5/0066* (2013.01); *G01M 5/0091* (2013.01)

(58) Field of Classification Search
CPC ........................................................ G01M 3/24
USPC ........................................................ 73/40.5 A
See application file for complete search history.

(56) References Cited

U.S. PATENT DOCUMENTS

| 4,896,303 | A |  | 1/1990 | Leslie et al. |
| 2004/0047534 | A1 |  | 3/2004 | Shah et al. |
| 2008/0266570 | A1 | * | 10/2008 | Sezerman ............ G01M 11/319 356/445 |
| 2009/0007651 | A1 |  | 1/2009 | Ramakrishan et al. |

FOREIGN PATENT DOCUMENTS

| CN | 1414283 | 12/2002 |
| CN | 1598516 | 7/2004 |
| DE | 30 13 465 | 10/1981 |
| EP | 1 096 273 | 5/2001 |
| EP | 1 598 637 | 11/2005 |

(Continued)

*Primary Examiner* — Alexander A Mercado
(74) *Attorney, Agent, or Firm* — McDonnell Boehnen Hulbert & Berghoff LLP

(57) ABSTRACT

The present invention relates to a method of integrity monitoring of a conduit. An optic fibre is provided optic fibre along the path of the conduit, and a fluid in the conduit is pressurized and depressurized. The optic fibre is interrogated to provide a distributed acoustic sensor, and data is sampled from a plurality of longitudinal portions of the fibre during the pressurizing and depressurizing. The data is processed to detect a signal characteristic of the integrity of the conduit.

19 Claims, 3 Drawing Sheets

(56) References Cited

FOREIGN PATENT DOCUMENTS

| | | |
|---|---|---|
| GB | 2299172 | 9/1996 |
| GB | 2436142 | 9/2007 |
| GB | 2442745 | 4/2008 |
| WO | WO 2003/002971 | 1/2003 |
| WO | WO 2008/001046 | 1/2008 |
| WO | WO 2008/098380 | 8/2008 |
| WO | WO 2009/158630 | 12/2009 |
| WO | WO 2010/034986 | 4/2010 |
| WO | WO 2010/136764 | 12/2010 |
| WO | WO 2011/017413 | 2/2011 |

* cited by examiner

INTEGRITY MONITORING OF CONDUITS

FIELD OF THE INVENTION

The present invention relates to integrity monitoring of conduits, in particular, it relates to leak detection in wells, such as production wells and injection wells, using distributed acoustic sensing (DAS).

BACKGROUND OF THE INVENTION

When a well such as an oil well is drilled, a bore hole is formed. This bore hole may be largely vertical or may have non-vertical sections. This bore hole is typically formed by rotary drilling.

FIG. 1 schematically illustrates a cross section of a section of a typical production well, for example for oil or gas production, after completion. After the bore hole is drilled into the ground 10, one or more casings 12, 16 are inserted into the bore hole. The casing(s) may be provide to protect aquifers, to provide pressure integrity, to ensure isolation of production formations and to prevent the bore hole from collapsing on itself. Typically a casing is inserted in discrete lengths of pipe that are coupled together, either by screwing adjacent sections together or by other suitable means. Where there are multiple casings a smaller diameter casing may be installed in a section of the wellbore where there is also a larger diameter casing. The smaller diameter casing may run through the whole length of the wellbore having the larger diameter casing or just part of such section, for instance the start of the smaller diameter casing being supported from the larger diameter section.

After a casing is located in the borehole it is typically cemented in place, at least for part of the depth of the well to seal the casing into the ground. Typically concrete 14, 16 is forced down the relevant casing, and out of the end, such that the concrete back fills the annular space between on the outer surface of the casing and its surroundings. Thus in the example shown in FIG. 1 larger diameter casing 16 is located in the well bore. Concrete would then be forced down the large diameter casing to back fill the space between casing 16 and the ground 10. Once this is cemented in place there may be further drilling and later the smaller casing diameter casing 12 may be inserted. This casing may also be sealed in place by cementing, but in this case the cement will back fill the void between the two casings 12 and 16.

There may be various types of casing used in a well. For example casing 12 could be a production casing. A production casing may be one of the last casings to be installed. In use therefore the interior of the production casing represents a pathway between the bottom of the well and the well head. Product could be carried to the surface via the production casing but usually production tubing is installed within the production casing and the production tubing carries the product. The additional, larger diameter, casing 16 may be an intermediate casing, a surface casing or a conductor casing. An intermediate casing may be used to protect against caving of weak or high pressured formations and to enable the use of drilling fluids of different density necessary for the control of lower formations. A surface casing may be used to protect fresh-water aquifers onshore, and to anchor blow out preventers (BOPs). A conductor casing may be used to support surface formations, and may be set soon after drilling has commenced since shallow parts of the bore hole can quickly cave in. As discussed the additional casing is inserted into the bore hole prior to the insertion of the production casing 12 and is set in place with concrete 18.

Although only a single casing 16 is shown in addition to the production casing 12, it should be apparent that multiple additional casings may be provided, with each additional casing being sealed in place with concrete.

When the concrete 14 around the production casing has set and the structure of the well is complete, a flow path is created from the production casing to a reservoir in the ground containing the fluid product. The most common method uses a jet perforating gun equipped with shaped explosive perforation charges. Fracturing may then be performed in order to increase the fluid flow from the reservoir to the production casing, thereby increasing the productivity of the well.

As the casings are generally inserted in discrete lengths that are coupled together, these joins can cause areas of concern in well formation and operation. Given that the casings are cemented into place on completion of the well and can only be removed by further drilling, it is desirable to check the integrity of these casings before they are cemented into place. Also, given the high cost of a well installation and the potential environmental and economic consequences involved if a well were to leak, it is desirable, to be able to monitor the integrity of a well. In particular, it is desirable to monitor for leaks in a well.

Embodiments of the present invention aim to address at least some of the above problems to some extent.

SUMMARY OF THE INVENTION

According to an aspect of the present invention, there is provided a method of integrity monitoring of a conduit, comprising: providing an optic fibre along the path of the conduit; providing a pressure differential between a fluid in the conduit and a fluid external to the conduit; interrogating the optic fibre to provide a distributed acoustic sensor, and sampling data from a plurality of longitudinal portions of the whilst said pressure differential exists; and processing said data to detect a signal characteristic of the integrity of the conduit.

The signal characteristic of the integrity of the conduit may be an acoustic signal indicative of a leak in the conduit. In the event of a leak the pressure differential will cause fluid to leak into or out of the conduit and this can create a detectable acoustic signature which can be detected.

The method may further comprise determining the position of origin of the signal along the optic fibre, and hence the conduit.

The step of providing the pressure differential may comprise the step of increasing the relative pressure of the fluid in the conduit. Alternatively, the step of providing the pressure differential may comprise decreasing the relative pressure of the fluid in the conduit.

The conduit may be a casing in a well bore. The integrity monitoring method may be performed in the production process of the well, prior to the conduit being cemented in place. The conduit may be a production casing.

The method may comprise a step of increasing the pressure of the fluid inside the production casing to a first predetermined level and allowing the pressure to reduce to a second predetermined level if a leak is present in production casing as fluid flows through the leak into a surrounding cavity. The surrounding cavity may be any cavity around the conduit under test but may in particular, where the conduit is a production casing, be defined by an intermediate casing positioned around the production casing. The steps of pressurizing the fluid in the production casing to the first predetermined level and allowing it to reduce may be performed a plurality of times so as to increase the pressure in the fluid surrounding the cavity. The method may then further comprise bleeding off the pressure in the production casing and monitoring for a signal characteristic of flow from the surrounding cavity, e.g. that defined by a intermediate casing, to the production casing using the distributed acoustic sensing.

The optic fibre may be provided via a wire line unit.

The method may comprise performing a plurality of iterations of the steps of providing a pressure differential and interrogating the optic fibre, i.e. a number if iterations of creating a pressure differential and then monitoring to detect whether or not there is a signal characteristic of a leak. The method may however comprise moving the optic fibre longitudinally with respect to the conduit between at least two of said iterations such that different sections of optic fibre are monitoring different sections of conduit between the iterations.

The processing step may comprise processing data acquired from said optic fibre at different positions with respect to the conduit so as to detect the signal characteristic of the integrity of the conduit. By moving the fibre with respect to the conduit systematic errors due to the optic fibre itself can be identified. If during a first iteration a signal is detected from a first section of optic fibre that corresponds to a first section of conduit and in a second iteration, after the fibre has been moved, a signal is detected from a second section of fibre which again corresponds to the first section of conduit than such signal may be assumed to be a genuine signal arising from the first section of conduit. However, if in the second iteration a signal was again detected from the first section of fibre, which now corresponds to a second section of conduit, then it may be that the signal is actually a systematic error to do with the optic fibre and interrogator and is not a genuine signal.

Additionally or alternatively the method may comprise providing a plurality of optic fibres along the path of said conduit and interrogating said plurality of optical fibres so as to provide a plurality of distributed acoustic sensors. Conveniently the plurality of optic fibres are provided within one fibre optic cable. As one skilled in the art a fibre optic cable may typically contain several optic fibre cores. In the present method at least two of these optic fibre cores are used for distributed acoustic sensing. A single interrogator may be used to interrogate said plurality of optic fibres using time division multiplexing. Again by processing the data from two or more optic fibres deployed along the path of the conduit systematic errors may be identified and eliminated. If a signal is detected with both optical fibres at the same location it is likely to be genuine whereas a signal detected with one optic fibre only may be a systematic error for the sensor formed using that optic fibre. It will be appreciated that each optic fibre used in a distributed acoustic sensor may lead to some systematic errors but these are unlikely to appear at the same place in each optic fibre even when a common interrogator unit is used.

According to another aspect of the present invention, there is provided an integrity monitoring apparatus for monitoring the integrity of a conduit, comprising: an optic fibre positioned along the length of the conduit; pressurizing means arranged to provide a pressure differential between a fluid in the conduit a fluid external to the conduit; an optic fibre interrogator adapted to interrogate an optic fibre and provide distributed acoustic sensing; and a processor adapted to receive sensed data from said interrogator to monitor the optic fibre to detect a signal characteristic of the integrity of the conduit. The pressurizing means may be a pressure truck.

The apparatus of this aspect of the invention offers all of the same advantages and can be used in all of the same embodiments as discussed above in relation to the method. In particular the apparatus may further comprise means for moving the optic fibre longitudinally with respect to the conduit. Additionally or alternatively the apparatus may comprise a plurality of optic fibres positioned along the length of said conduit wherein said optic fibre interrogator is adapted to interrogate said plurality of optic fibres using time divisional multiplexing.

As discussed above, by moving the optic fibre of a distributed acoustic sensor with respect to a monitored location, e.g. a conduit, systematic errors arising within distributed acoustic sensor may be identified and thus eliminated. Thus according to another aspect of the present invention, there is provided a method of distributed acoustic sensing, comprising: arranging an optic fibre with respect to an area of interest; changing the longitudinal position of the optic fibre with respect to the area of interest; interrogating the optic fibre to provide a distributed acoustic sensor, and sampling data from a plurality of longitudinal portions of the optic fibre as the position of the optic fibre is changed with respect to the area of interest; and processing said data to determine acoustic signals incident on said fibre from said area of interest.

The method may further comprise: determining the position of origin of a detected signal along the optic fibre, and the corresponding location in the area of interest as the position of the optic fibre is changed. If the position of origin stays constant with respect to the conduit, said signal is deemed to arise from the area of interest, and if the position or origin stays constant with respect to the optic fibre, said signal is deemed to be arise within said optic fibre.

According to another aspect of the present invention, there is provided distributed acoustic sensor apparatus comprising: an optic fibre interrogator adapted to interrogate an optic fibre deployed within an area of interest and to provide distributed acoustic sensing; and a processor adapted to receive and process sensed data from said interrogator to determine acoustic signals incident on said fibre from said area of interest; the apparatus further comprising position change means arranged to change the longitudinal position of the optic fibre with respect to the conduit.

As also mentioned above systematic errors in a fibre optic distributed acoustic sensor can also be identified by using multiple optic fibre cores. Thus according to another aspect of the present invention, there is provided a method of distributed acoustic sensing, comprising: providing a plurality of optic fibre cores along a path in an area of interest; interrogating the plurality of optic fibre cores to provide distributed acoustic sensing on each core, and sampling data from a plurality of longitudinal portions of the optic fibres; and processing said data to determine a genuine incident signal if at least two optic fibre cores provide substantially the same signal characteristic at the same position along the path.

The plurality of optic fibre cores may be provided in a single optic fibre cable. The plurality of optic fibre cores may be interrogated from a single interrogator using time division multiplexed interrogating pulses.

According to another aspect of the present invention, there is provided a fibre optic distributed acoustic sensing apparatus, comprising: a plurality of optic fibre cores positioned along a path; an optic fibre interrogator adapted to interrogate the plurality of optic fibre cores and provide distributed acoustic sensing on each core; and a processor adapted to receive sensed data from said interrogator to monitor the optic fibre cores to determine a genuine incident signal if at least two optic fibre cores provide substantially the same signal characteristic at the same position along the path.

The plurality of optic fibre cores may be provided in a single optic fibre cable. The plurality of optic fibre cores may be interrogated from a single interrogator using time division multiplexed interrogating pulses.

DESCRIPTION OF THE DRAWINGS

The invention will now be described by way of example only with respect to the following drawings, of which.

DESCRIPTION OF THE INVENTION

Figure 1:
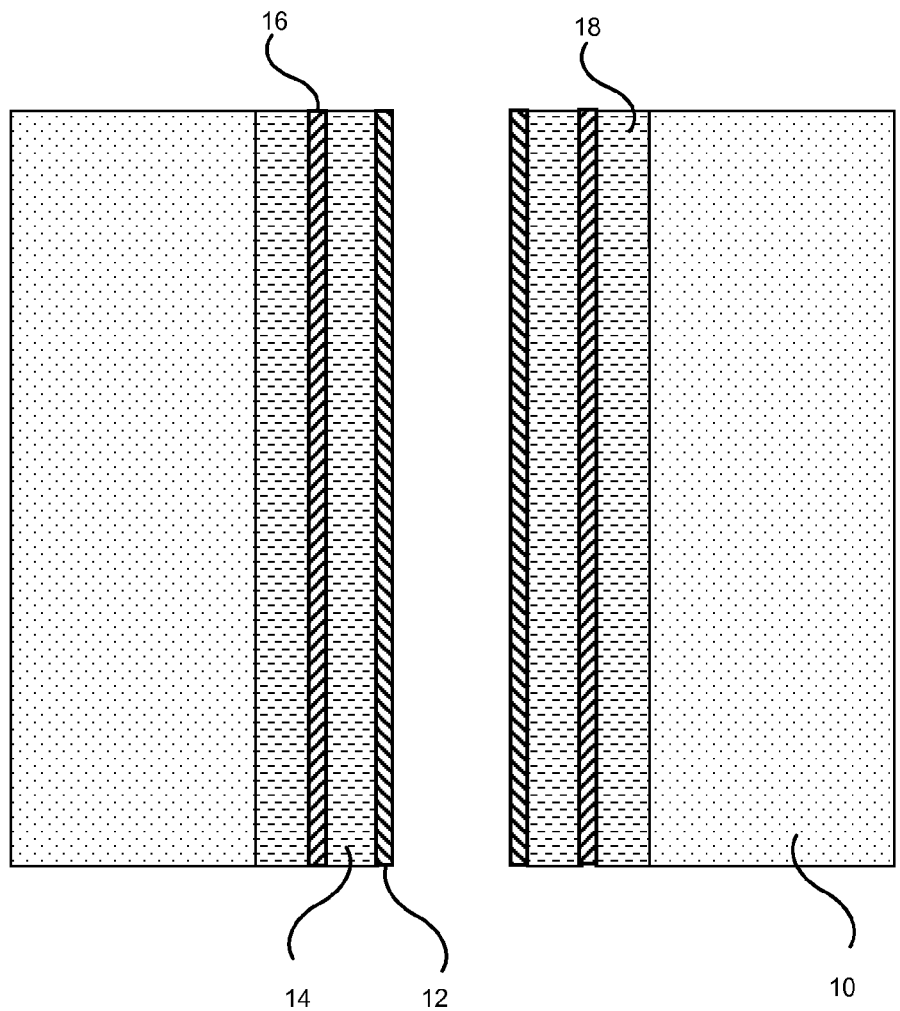
FIG. 1 schematically illustrates a cross section of a typical well.
Figure 2:
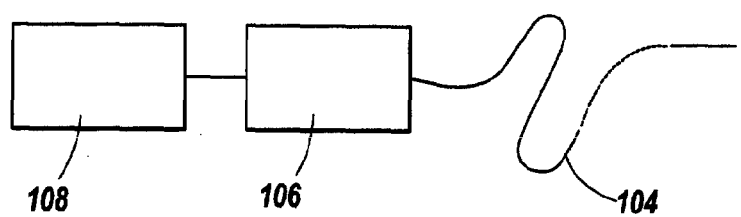
FIG. 2 schematically illustrates the basic component of a distributed fibre optic sensor.

FIG. 2 shows a schematic of a distributed fibre optic sensing arrangement. A length of sensing fibre 104, which may be standard optic fibre such as used in telecommunication applications, is connected at one end to an interrogator 106. The output from interrogator 106 is passed to a signal processor 108 and optionally a user interface, which in practice may be realised by an appropriately specified PC. The sensing fibre can be many kilometres in length, for example up to 40 km long. However, in down well applications the length of the sensing fibre is typically from say 1 to 5 km long.

The interrogator 106 launches an interrogating optical signal, which may for example comprise a series of pulses having a selected frequency pattern, into the sensing fibre. The phenomenon of Rayleigh backscattering results in some fraction of the light input into the fibre being reflected back to the interrogator, where it is detected to provide an output signal which is representative of acoustic disturbances in the vicinity of the fibre. Raman and Brillouin scattering can also utilised to obtain signals which are representative of acoustic disturbances in the vicinity of the fibre, as will be apparent to the skilled person. The form of the optical input and the method of detection allow a single continuous fibre to be spatially resolved into discrete sensing lengths. That is, the acoustic signal sensed at one sensing length can be provided substantially independently of the sensed signal at an adjacent length. The spatial resolution may be approximately 10 m or less and may be 1 or 2 m.

The distributed acoustic sensor may, for instance, by a distributed acoustic sensor such as described in GB patent application publication No. 2,442,745, the contents of which are hereby incorporated by reference thereto. The distributed acoustic sensor as described in GB 2,442,745 determines acoustically induced strains on the optical fibre by determining the phase change on the optical fibre. Using a phase change in the optical fibre as a measure of disturbances allows low frequency strains on the optical fibre to be detected which is particularly advantageous in the embodiments of the present invention.

It should be noted that as used herein the term 'acoustic' shall be taken to mean any type of disturbance that may create an optical path length change on an optic fibre and includes any type of mechanical and pressure wave as well as low frequency strain.

Using a distributed acoustic sensor, such as described in GB2,442,745, a single sensing fibre can provide sensed data which is analogous to a multiplexed array of adjacent sensors, arranged in a linear path, which may be straight or curved depending on the application.

The fibre optic 104 may be used in one embodiment to test the integrity of a conduit 122, by determining signals characteristic of the integrity of the conduit as the conduit is pressurized and depressurized. By pressurizing and/or depressurizing the fluid within the conduit a pressure differential can be created with the fluid surrounding the conduit. If there is a leak in the conduit fluid may be forced out of, or into, the conduit under pressure which will lead to an identifiable acoustic signal. The conduit may be a well casing and the examples below will discuss application to a production casing. However it will be appreciated that other casings or the production tubing for instance could be tested in the same way.

Figure 3:
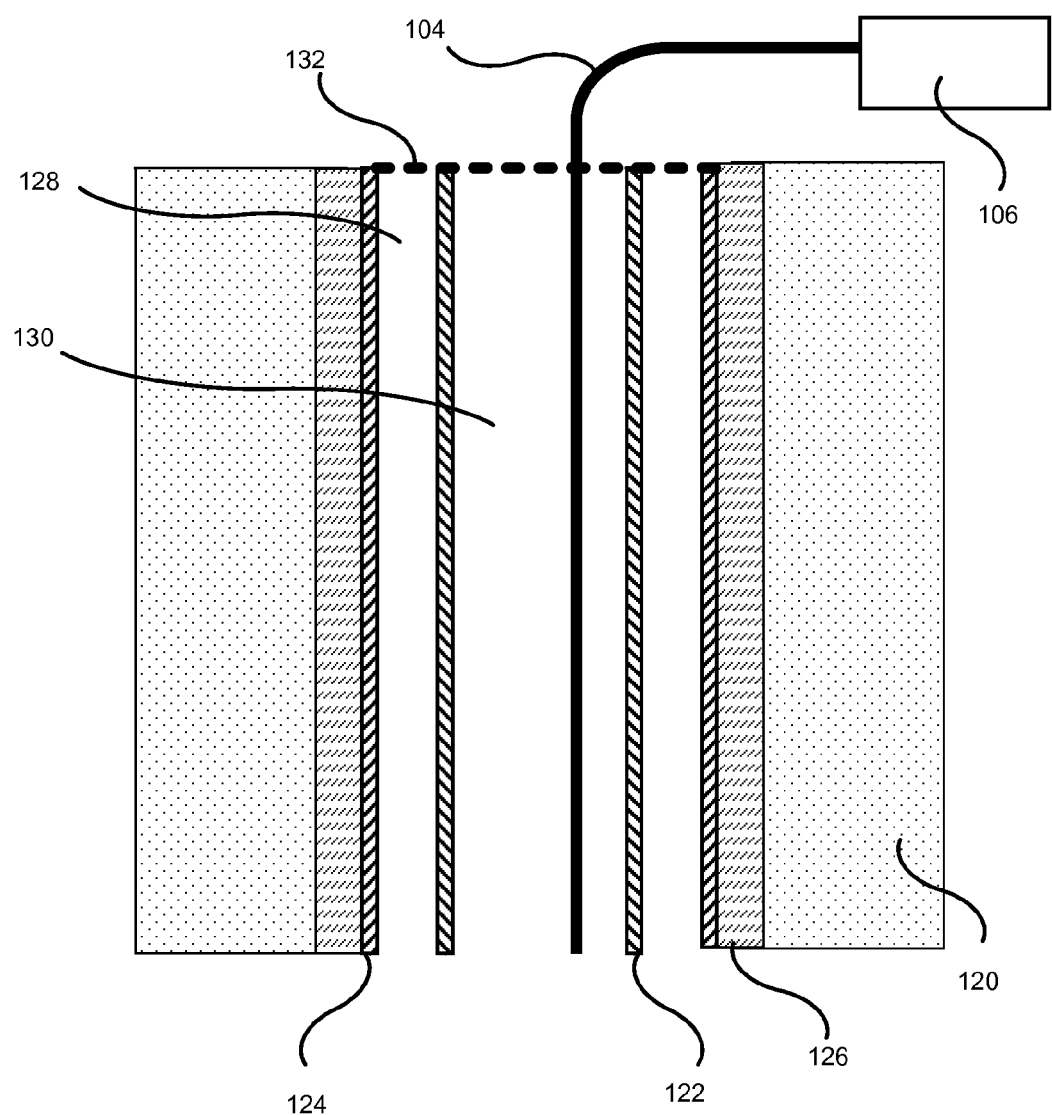
FIG. 3 schematically shows a cross section in which a fibre optic is provided within a production well that has been drilled into the ground.

In order to perform the integrity testing, a fibre optic 104 is deployed in a well, as shown in FIG. 3. FIG. 3 schematically shows a cross section in which a fibre optic 104 is connected at one end to an interrogator 106 and is provided within a production well that has been drilled into the ground 120. The fibre optic 104 may be provided with a wire line unit, as would be apparent to the person skilled in the art.

The fibre optic 104 is shown positioned within a production casing 122. However in other embodiments the fibre optic 104 could be arranged outside of the production casing, for instance the fibre optic could be attached to the outside of the production casing as the production casing is inserted into the well. An intermediate casing 124 is provided around the production casing 122. Although an intermediate casing is shown, as would be apparent to the skilled person, the casing 124 could be any form of casing in addition to the production casing 122. Also, there may be multiple different casings provided around the production casing 122. Alternatively for some parts of the well there may be no additional casing outside the production casing 122.

It should be noted that FIG. 3 shows the well in an intermediate stage of construction in which the intermediate casing 124 has been cemented 126 in place, but the production casing 122 has not yet been cemented in place. However, a plug (not shown) which may be a cement plug or other suitable plug, may be provided in the production casing 122, to seal the volume of the production casing that is to be integrity tested. The purpose of the plug in the production casing is to isolate the interior of production casing from the exterior of the production casing, i.e. the gap between the production and intermediate casings, such that any flow of fluid from the production casing to the intermediate casing and vice versa can only occur through any leaks in the wall or between the joints of the production casing.

It is also necessary to provide a seal 132 the top of the production casing 122 at the surface of the well, to allow the pressure to be raised in the production casing 122. The seal 132 could be any form of seal that prevents fluid from escaping the casings.

The pressure in the internal volume of the production casing 130 may be increased. This may be performed using a pressure truck or other suitable means which are not shown in FIG. 3. If there is air within the well then the pressure of the air in the production casing may be increased. Often however the well bore may contain water at various stages of production and thus the casing may be full, or partly full of water. In this case the casing would be filled with water which is pressurized. Alternatively, another liquid fluid or other gas may be introduced into production casing to be pressurized.

As the pressure of the fluid in the production casing is increased, fibre optic 104 is interrogated to perform DAS. If any cracks or leaks exist in the production casing walls 122, or if there are any faults with the joins between the sections of the production casing, fluid will escape from the production casing 122 at these positions. As the pressure inside the production casing is being increased, a pressure differential is created between volume inside the production casing 130 and volume outside of it 128. This pressure difference will cause fluid to flow from inside the production casing volume 130 to the volume outside 128 through any defects that are present in the production casing wall 122. This flow of fluid can be detected with the DAS.

If a flow from the production casing 122 is detected, the integrity of the production casing may be determined to be compromised. The location of the fault can be determined using the DAS, as would be apparent to the skilled person, and the production casing could then either be repaired, potentially replaced or further investigations into the nature of the integrity flaw can be carried out.

The pressure in the volume 130 production casing may be increased, without changing the pressure of the volume 128 outside the production casing in order to create a pressure differential between the two volumes. Alternatively or alternatively, the relative pressure may be increased in the volume 130 inside the production casing by reducing the pressure in the volume 128 outside the production casing.

Although the above describes raising the pressure of a fluid in the production casing to create a pressure differential between the volume 130 inside the production casing and the volume 128 outside it in order to perform integrity checking, the pressure differential may be created by decreasing the pressure of a fluid inside the production casing relative to the fluid surrounding the cavity. In this situation, if any cracks or leaks exist in the production casing walls 122, or if there are any faults with the joins between the sections of the production casing, fluid will flow from the volume 128 outside the production casing to the internal volume 130 of the production casing 122 at these positions due to the decrease in relative pressure inside the production casing. This may involve increasing the pressure in the volume 128 external to the production casing 122 and/or decreasing the pressure in the volume 130 inside the production casing 122.

As indicated above, if there is a leak in the production casing or a fault in the joints of the production casing, and the pressure inside the production casing is increased (relative to the pressure outside of the production casing), fluid will flow from the production casing to the volume 128 outside. As the fluid flows from the volume 130 inside the production casing to the volume 128 outside the production casing, the pressure in the volume outside the production casing will also begin to increase due to the ingress of fluid. This effect can be used in an embodiment of the present invention for integrity monitoring/testing.

In an embodiment of the present invention, the pressure inside the production casing may be increased until the pressure has reached a first predetermined threshold. The first threshold may be relatively high so as to provide a potentially high pressure difference between the inside and outside of the production casing, which will aid in the detection of leaks, whilst remaining within the safe operating pressure for the casing and any other well apparatus.

The pressure inside the production casing will then decrease if a leak is present and the integrity of the production casing can be monitored using the fibre optic 104, as the fluid flows from the volume 130 inside the production casing to the volume 128 outside the production casing, as described above. The pressure inside the production casing may be allowed to decrease until it has reached a second predetermined threshold value. This second predetermined threshold value may be a 20% reduction from the first predetermined threshold value, or similar.

The pressure may then be increased inside the production casing back to a higher value, such as the original first predetermined threshold value, while monitoring the integrity of the production casing using the fibre optic 104 and interrogator 106, as fluid flows from the volume 130 inside the production casing to the volume 128 outside the production casing.

The pressure may again be allowed to decrease, for example again to the second predetermined value or for a set period of time or until no further pressure decrease is detected. These steps of increasing the pressure and allowing it to decrease as the fluid flows from the volume 130 inside the production casing to the volume outside the production casing may be performed a plurality of times, with the fibre optic being interrogated during at least the pressure release step to determine whether there are any signals characteristic of a leak. This cycle may be repeated for a desired number of time. It will be appreciated however that repetitions of this process the pressure of the fluid outside the production casing will increase. The steps of pressuring and allowing decrease may therefore be repeated until the pressure in the volume 128 outside the production casing is substantially equalised with the pressure inside the production casing at the first predetermined pressure level. During the repetition of the pressurizing and depressurizing steps, the pressure may be allowed to reduce by a smaller amount, for example from 20% of the first predetermined value to 10% of the first predetermined value, as the pressure in the volume 128 outside the production casing is increased due to the ingress of fluid from the volume 130 inside the production casing caused by the pressure differential. The integrity is monitored using the fibre optic 104 and interrogator 106 throughout this process.

Once the pressure in the volumes 128, 130 is substantially equalized or at least the pressure in the fluid outside the casing has increased from its starting value by a desired amount, the pressure may then be bled off from the volume 130 inside the production casing such that the pressure inside the production casing 130 is reduced. As the pressure is now lower in the volume 130 inside the production casing than in the volume 128 between the production casing and the intermediate casing, this pressure difference will cause fluid to flow from outside the production casing volume 128 to the volume inside 130 through any defects that are present in the production casing wall 122. This flow of fluid can be detected with the DAS.

Using this method, the largest pressure differentials will occur when the pressure inside the production casing is initially increased and when the pressure is finally bled off from the production casing. These largest pressure differentials will cause the largest flow rates through any faults in the production casing and will provide the strongest DAS signals. Also, as the steps of increasing and decreasing the pressure are performed a plurality of times, this allows for DAS to be performed multiple times on the production casing, albeit with gradually smaller and smaller flow rates though defects. This may provide multiple opportunities to check for defects and will allow any indication of an integrity defect to be checked multiple times, as the location of any defect should remain constant. The method also ensures that the maximum pressure differential is always controlled as the pressure inside the production casing never exceed the first predetermined threshold which may be chosen to be within safe operating limits. The method also allows testing of the casing with both a positive pressure differential and a negative pressure differential between the interior and the exterior of the casing.

The present invention may allow for the integrity of a production casing to be determined before the production casing is set in place with concrete. By performing the integrity analysis at this stage, time and money can be saved if the production casing is found to be defective.

The above describes methods by which the integrity of a production casing can be monitored/tested. However, if a signal characteristic of a leak is detected, it is desirable to know if this signal is in fact a signal associated a leak or if it is systematic error, e.g. a fixed noise type error or an artefact associated with the fibre. It is therefore desirable to be able to validate a leak detection signal.

In one embodiment, the fibre optic 104 is used to monitor the integrity of the production casing 122, while the fibre optic 104 is being moved longitudinally with respect to the production casing.

Figure 4:
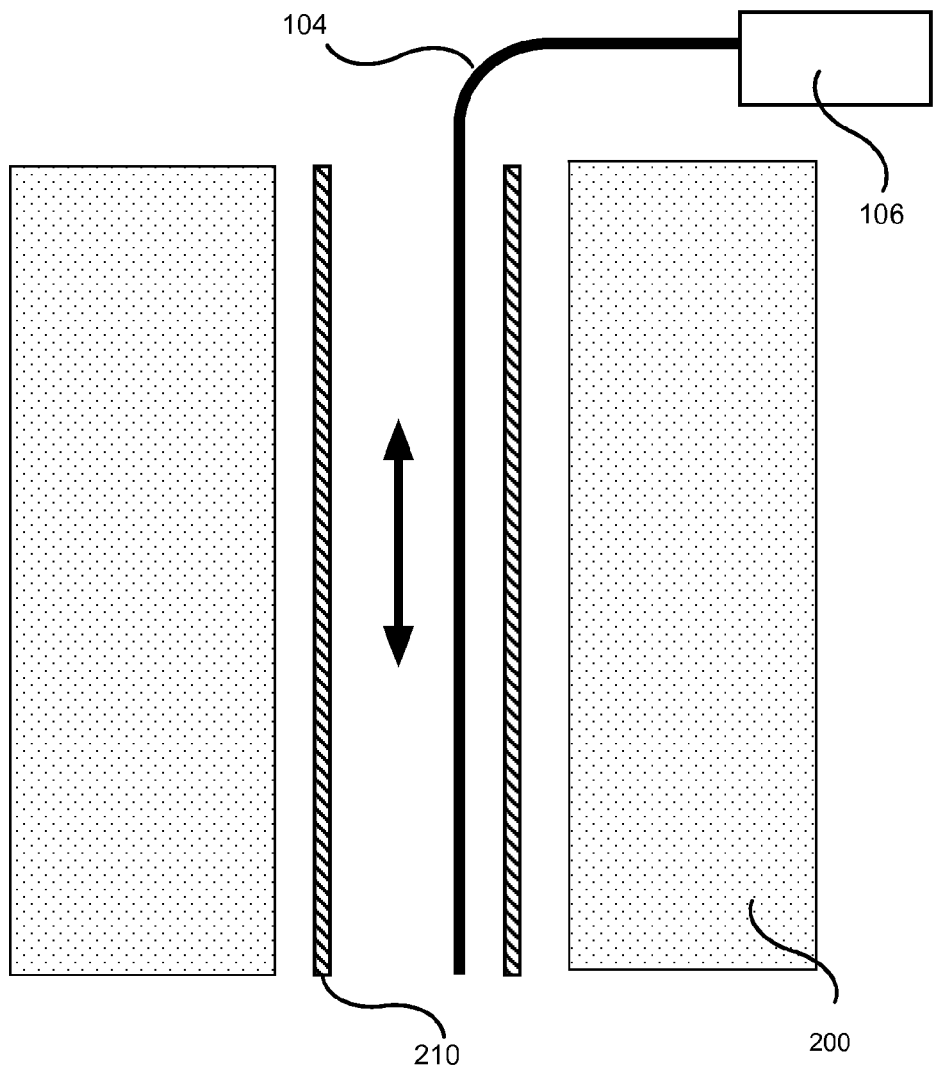
FIG. 4 schematically shows a validation apparatus according to an embodiment of the present invention.

In order to perform the integrity monitoring, a fibre optic 104 is deployed in a well, as shown in FIG. 4. FIG. 4 schematically shows a cross section in which a fibre optic 104 is connected at one end to an interrogator 106 and is provided within a production well that has been drilled into the ground 200. The fibre optic 104 may be provided with a wire line unit, as would be apparent to the person skilled in the art.

The fibre optic 104 is positioned within a production casing 210. Although no additional casings are shown in FIG. 4, it should be apparent that an intermediate casing or the like may be provided around the production casing 210.

It should be noted that although FIG. 4 shows the well in an intermediate stage of construction in which the production casing 210 has not been cemented in place, the production casing 210 may be cemented in place.

If a leak is present the production casing 210, fluid will escape the production casing via the leak. This leak can be detected via DAS, however, it may not be possible to determine if the detected leak is actually a leak or if it is the result or an inconsistency in the sensing fibre 104. In order to determine this, a means for moving the fibre 104 longitudinally with respect to the production casing 104 (as shown by the arrow in FIG. 4) is provided. It is necessary that the fibre is moved at least a longitudinal distance equal to the sensing length of the fibre. By moving the fibre 104, if a detected signal is characteristic of a systematic error in the detector, rather than being characteristic of the integrity of the production casing, the location of the signal will follow the movement of the fibre 104.

In other words, if the position of origin of the signal stays constant with respect to the production casing 210, an integrity condition is detected in which the integrity of the production casing 210 may be compromised. However, if the position or origin of the signal stays constant with respect to the optic fibre 104, no integrity condition is detected and the signal may be determined to be characteristic of a system error.

This method may be used with the fibre optic deploying in a well in production or before the well is completed. This method could also be used in isolation to or combination with the pressurizing method as described in relation to FIG. 3.

In addition to or instead of moving the optic fibre, in another embodiment, in order to validate a leak detection signal, two or more optic fibres could be interrogated at the same time. These fibres may be redundant fibres present in a well that are not being used for data transfer down the well and they would follow substantially the same path down the well. If two or more of these fibres are interrogated at the same time, systematic errors with a single fibre will be highlighted, as a leak detection signal should be detected by all fibres at the same location. If all fibres detect a signal characteristic of a leak, it is likely that the signals are characteristic of a genuine leak. However, if only a single fibre detects a signal, this may be indicative of a false signal. The multiple fibres may be interrogated by a single interrogator unit, which uses time division multiplexed (TDM) interrogating pulses.

Figure 5:
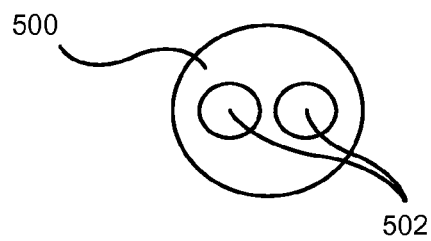
FIG. 5 schematically shows a multiple core optic fibre.

Preferably, a multi core fibre could be used. FIG. 5 shows a dual core fibre 500, which has two optic fibre cores 502 within the coating of the fibre 500. Although FIG. 5 shows a dual core fibre 500, it should be apparent a multi core fibre may contain more than two optic fibre cores.

As with using two separate fibres, the two cores 502 of fibre 500 can be interrogated using a single interrogator unit, which uses time division multiplexed (TDM) techniques. For instance interrogating pulses may be generated for one optic fibre and then the next optic fibre at short intervals. Two or more separate detectors could process the returns for each optic fibre separately and/or a single detector could be multiplexed with the returns from the separate fibres.

By deploying a fibre such as fibre 500 down a production well, the validity of leaks signals can be checked without the need for a different monitoring system, therefore reducing cost and monitoring time.

This method may be used with the fibre optic deploying in a well in production or before the well is completed. This method could also be used in isolation to or combination with the pressurizing method as described in relation to FIG. 3. This method could also be used in isolation to or combination is the validation method as described in relation to FIG. 4.

Although the above described monitoring the integrity of a production casing, it should be apparent that the above method could be equally applied to monitoring the integrity of an intermediate casing, a surface casing or a conductor casing or indeed production tubing or any conduit within a well.

Also, the above describes monitoring the integrity of a production casing before the production casing is cemented into place. However, as will be understood, detecting the signals characteristic of leaks could also be detected with the above methods after the casings have been cemented in place.

It will also be appreciated that the methods and apparatus described above relate to methods and apparatus of distributed acoustic sensing that allow identification of systematic errors arising from the combination of optic fibre and interrogator and discrimination of genuine incident signals.

These methods and apparatus have been described in relation to monitoring the integrity of a conduit but could be applied to other applications as well.

Clearly the method of moving the optic fibre with respect to the area to be monitored requires an apparatus capable of moving the optic fibre. the optic fibre could be attached to a moveable item, such as a steel rope or the like which may be winced (at one or both ends). However in situations where the fibre optic is constrained and is not readily movable then the embodiment using multiple optic fibre cores may be preferred.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method of integrity monitoring of a conduit, comprising:
   (i) providing an optic fibre along the path of the conduit;
   (ii) providing a seal across a cross-section of the conduit;
   (iii) providing a pressure differential between a fluid in the conduit and a fluid external to the conduit;
   (iv) interrogating the optic fibre to provide a distributed acoustic sensor, and sampling data from a plurality of longitudinal portions of the fibre whilst said pressure differential exists;
   (v) allowing the pressure differential to at least partially reduce;
   (vi) increasing the pressure differential;
   (vii) interrogating the optic fibre to provide the distributed acoustic sensor, and sampling data from the plurality of longitudinal portions of the fibre whilst said pressure differential exists; and
   (viii) processing said data sampled in steps (iv) and (vii) to detect a signal characteristic of the integrity of the conduit, wherein the method further comprises moving the optic fibre longitudinally with respect to the conduit between step iv and step vii and determining a location of a position of origin of a detected signal along the optic fibre, wherein the method further comprises determining if the location of the position of origin of signal changes as a position of the optic fibre is changed and, when the position of origin stays constant with respect to the conduit, deeming said signal to arise from an area of interest, and when the position of origin stays constant with respect to the optic fibre, deeming said signal to arise from within said optic fibre.

2. The method according to claim 1, wherein said signal is an acoustic signal indicative of a leak in the conduit.

3. The method according to claim 1, further comprising: determining the position of origin of the signal along the optic fibre, and hence the conduit.

4. The method according to claim 1, wherein the step of providing the pressure differential comprises the step of (i) increasing the relative pressure of the fluid in the conduit, or (ii) decreasing the relative pressure of the fluid in the conduit.

5. The method according to claim 1, wherein the conduit is a casing in a well bore.

6. The method according to claim 5, wherein the integrity monitoring method is performed in the production process of the well, prior to the casing being cemented in place.

7. The method according to claim 5, wherein the conduit is a production casing.

8. The method according to claim 7, wherein the step of providing the pressure differential comprises a step of increasing a pressure of the fluid inside the production casing to a first predetermined level and allowing the pressure to reduce to a second predetermined level if a leak is present in production casing as fluid flows through the leak into a surrounding cavity.

9. The method as claimed in claim 8 wherein said surrounding cavity is defined by an intermediate casing positioned around the production casing.

10. The method according to claim 8, comprising performing the steps of pressurizing the fluid in the production casing to the first predetermined level and allowing it to reduce a plurality of times so as to increase the pressure in the fluid in the surrounding cavity.

11. The method according to claim 10, further comprising bleeding off the pressure in the production casing and monitoring for a signal characteristic of flow from the surrounding cavity into the production casing using the distributed acoustic sensing.

12. The method according to claim 8, comprising performing the steps of pressurizing the fluid in the production casing to the first predetermined level and allowing it to reduce a plurality of times so as to increase a pressure of the fluid in the surrounding cavity until the pressure in the surrounding cavity is substantially equalised with the pressure in the production casing at the first predetermined level.

13. The method according to claim 1, wherein the optic fibre is provided via a wire line unit.

14. The method as claimed in claim 1 wherein the processing step comprises processing data acquired from said optic fibre at different positions with respect to the conduit so as to detect the signal characteristic of the integrity of the conduit.

15. The method as claimed in claim 1 comprising providing a plurality of optic fibres along the path of said conduit and interrogating said plurality of optical fibres so as to provide a plurality of distributed acoustic sensors.

16. The method as claimed in claim 15 comprising using a single interrogator to interrogate said plurality of optic fibres using time division multiplexing.

17. An integrity monitoring apparatus for monitoring the integrity of a conduit, comprising:
   an optic fibre positioned along the length of the conduit;
   pressurizing means arranged to provide a pressure differential between a fluid in the conduit and a fluid external to the conduit;
   a seal arranged across a cross-section of the conduit to seal the conduit;
   an optic fibre interrogator adapted to interrogate the optic fibre and provide distributed acoustic sensing;
   a means for changing the position of the optic fibre longitudinally with respect to the conduit; and
   a processor adapted to receive sensed data from said interrogator to monitor the optic fibre to detect a signal characteristic of the integrity of the conduit, and, in use of the apparatus, to monitor the optic fibre while the pressure differential exists, wherein the pressure differential is created and allowed to reduce iteratively and the fiber monitored for each of a plurality of iterations and detect a location of a position of origin of a detected signal along the optic fibre in an area of interest as the position of the fibre is changed, the processor further adapted to determine if the location of the position of origin of signal changes as the position of the optic fibre is changed and, when the position of origin stays constant with respect to the conduit, deeming said signal to arise from the area of interest, and when the position of origin stays constant with respect to the optic fibre, deeming said signal to arise from within said optic fibre;

wherein the means for changing the position of the optic fibre is configured to change the position between at least two of said iterations.

18. The apparatus according to claim 17, wherein the pressurizing means is a pressure truck.

19. The apparatus as claimed in claim 17 comprising a plurality of optic fibres positioned along the length of said conduit wherein said optic fibre interrogator is adapted to interrogate said plurality of optic fibres using time divisional multiplexing.

* * * * *